Feb. 13, 1934.  N. A. NICHOLSON  1,946,875
MOTION PICTURE APPARATUS
Filed Jan. 22, 1930  4 Sheets-Sheet 1
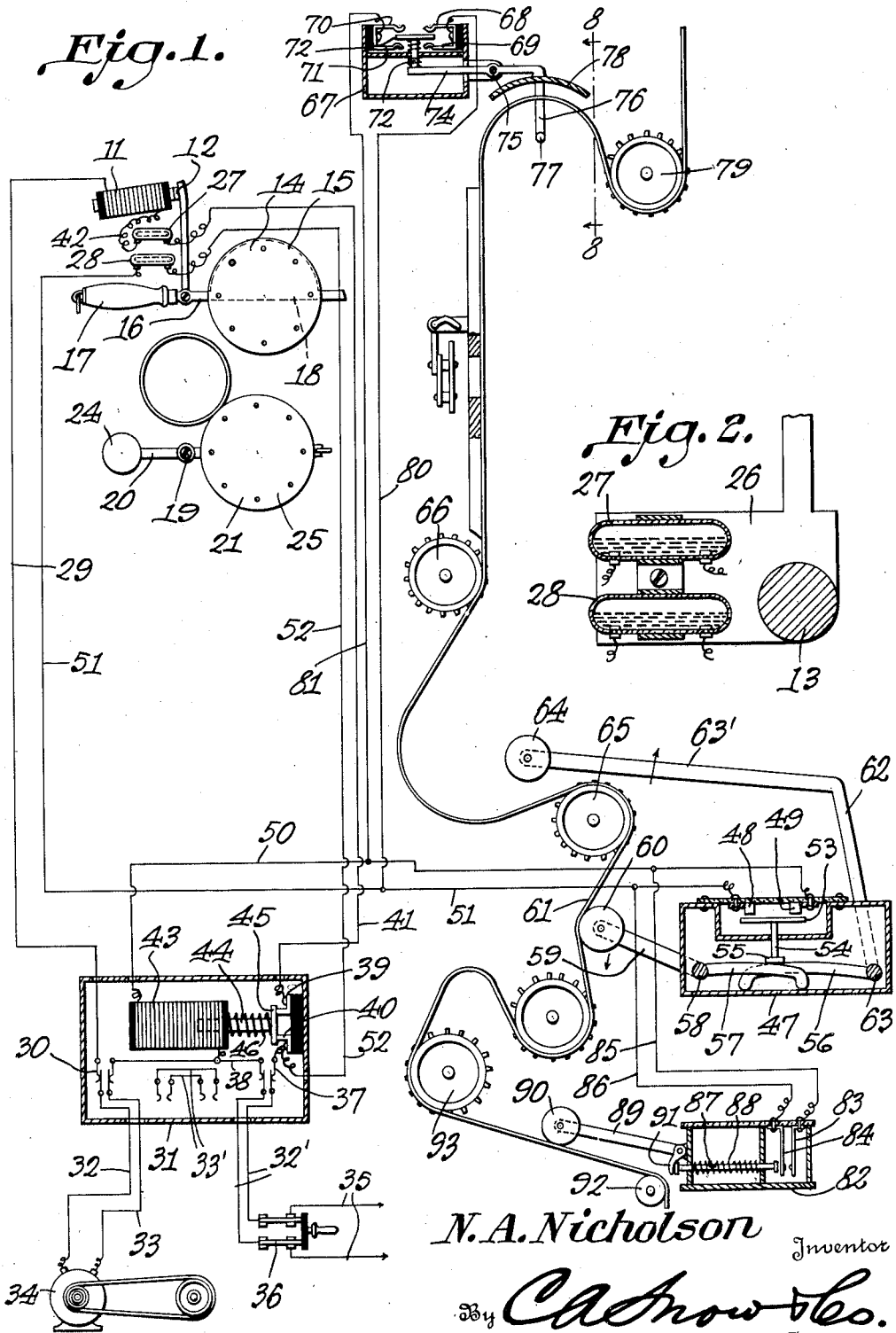
N. A. Nicholson
Inventor
By C. A. Snow & Co.
Attorneys.

Feb. 13, 1934.          N. A. NICHOLSON          1,946,875
MOTION PICTURE APPARATUS
Filed Jan. 22, 1930     4 Sheets-Sheet 2
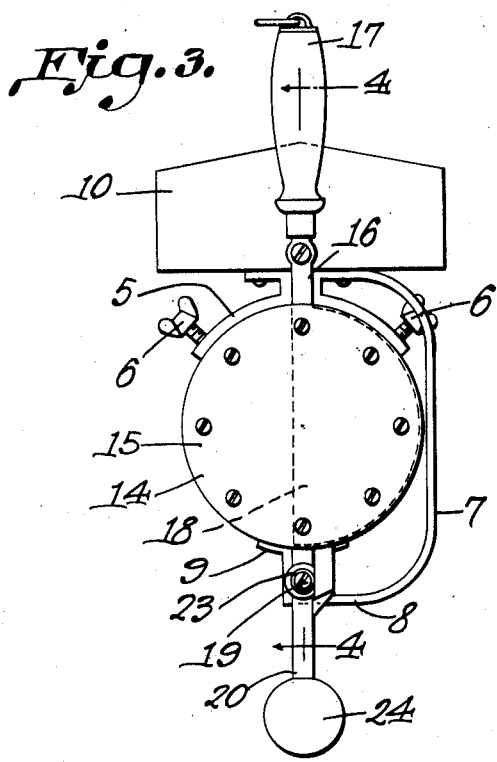
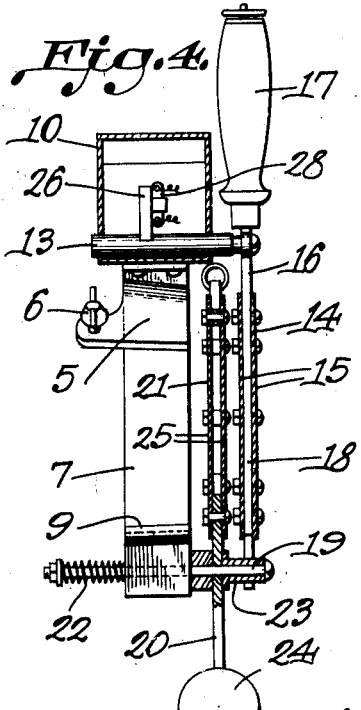
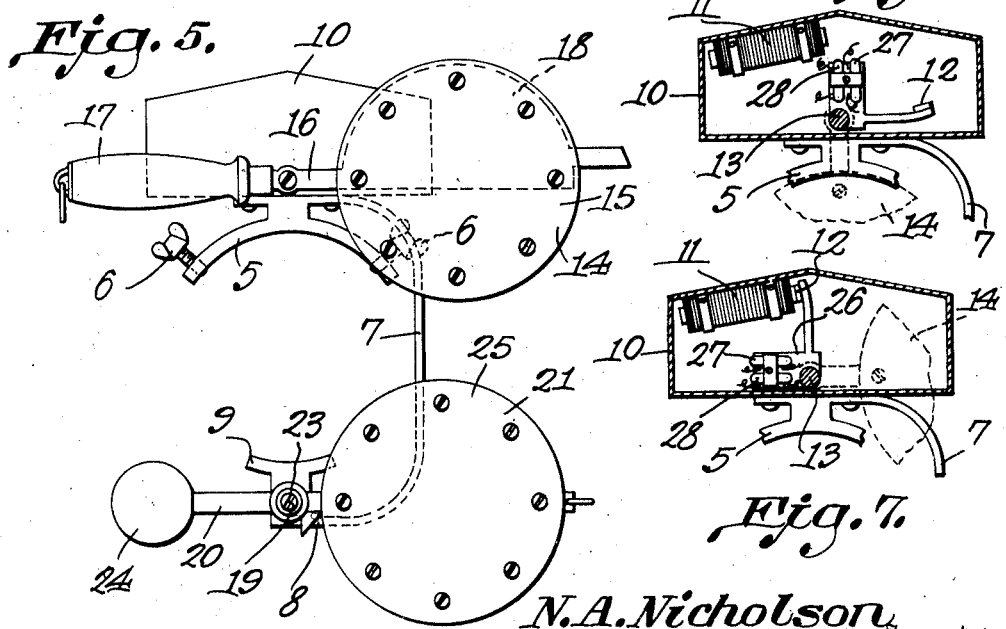
N. A. Nicholson, Inventor
By C. A. Snow & Co.
Attorneys.

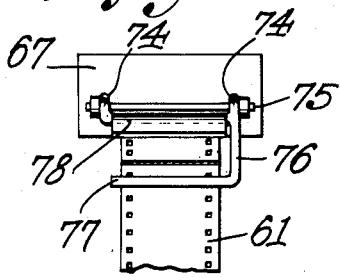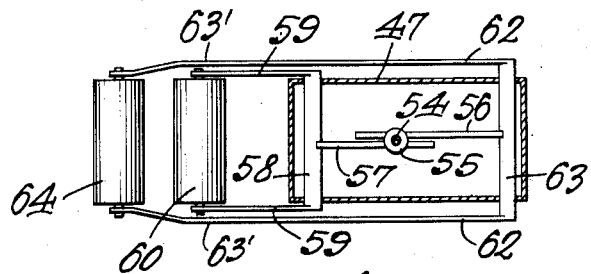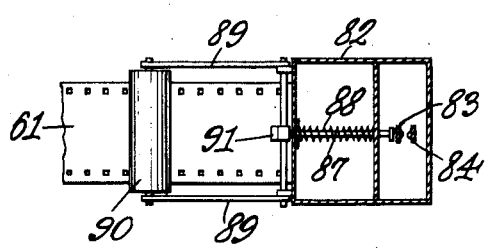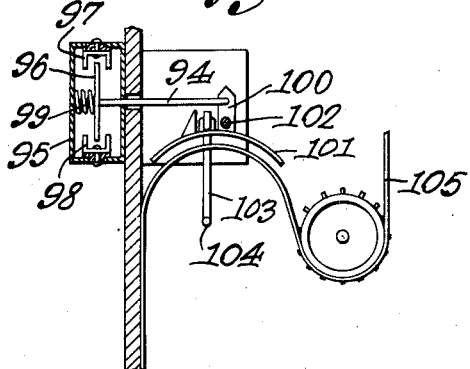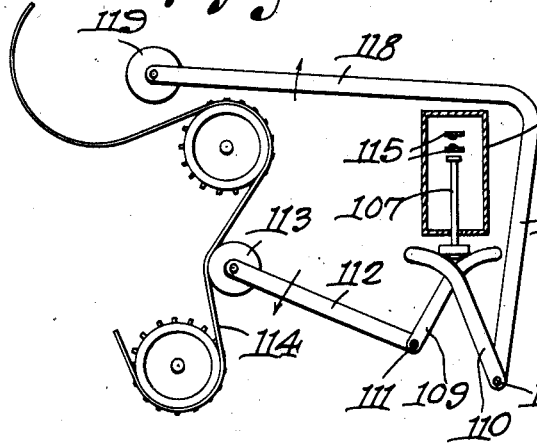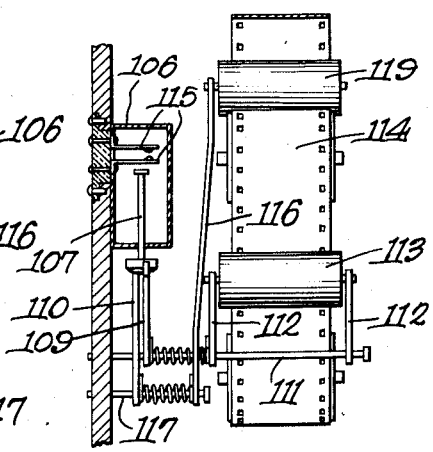

Feb. 13, 1934.  N. A. NICHOLSON  1,946,875
MOTION PICTURE APPARATUS
Filed Jan. 22, 1930  4 Sheets-Sheet 4
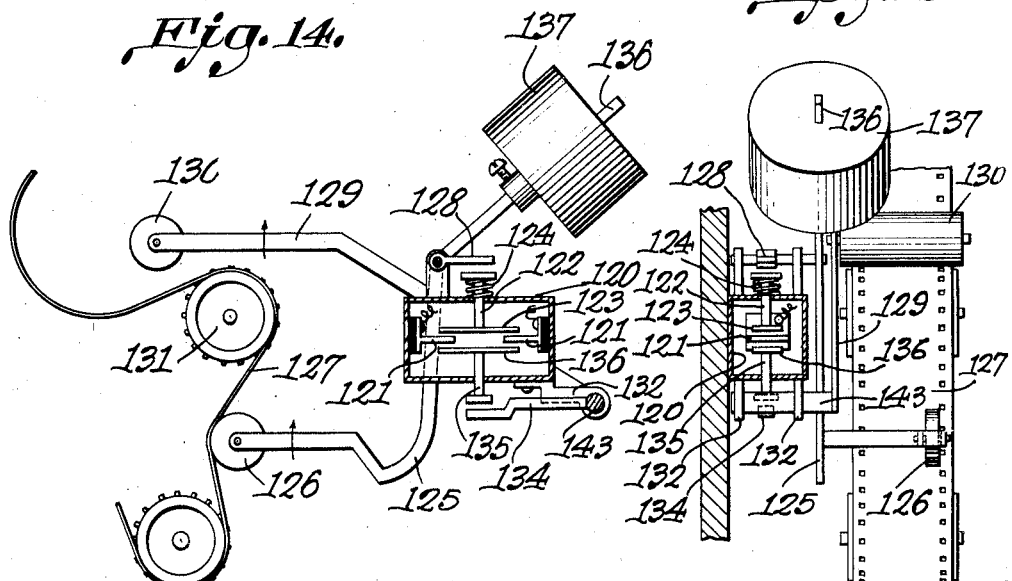
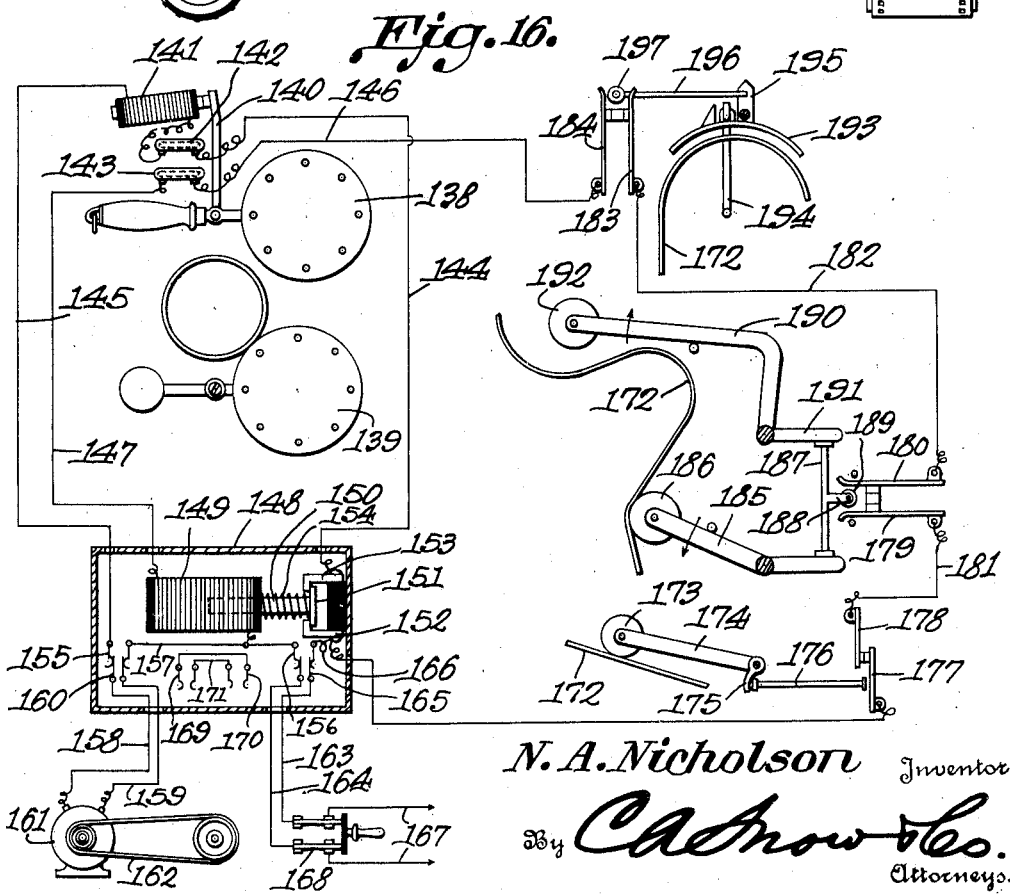
N. A. Nicholson, Inventor
By C. A. Snow & Co.
Attorneys.

Patented Feb. 13, 1934

1,946,875

UNITED STATES PATENT OFFICE 1,946,875

MOTION PICTURE APPARATUS

Nicholas A. Nicholson, Johnstown, Pa.

Application January 22, 1930. Serial No. 422,606

1 Claim. (Cl. 88—17)

This invention relates to motion picture apparatus, the primary object of the invention being to improve in detail upon the construction shown and described in my copending application Serial No. 353,439 filed April 8, 1929, whereby the efficiency of the entire apparatus is increased and rendered exceptionally easy of manipulation by the attendant to accomplish the various operations, incident to the use and operation of an apparatus of this character.

An important object of the invention is to provide means for automatically breaking the circuit to the motor of the projecting machine, and simultaneously operating a shutter to cut off the light rays to the film passing through the machine, when the film breaks, buckles or otherwise becomes damaged, or inoperative.

Another important object of the invention is to provide a manually operated shutter to be used to guard the film against the heat from the light rays projected from the lamps of the machine when a picture strip is being changed from one machine to another.

A still further object of the invention is to provide means for automatically breaking the circuit to the motor of the machine when the film strip becomes taut.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a diagram illustrating the shutter, film strip, and automatic switch members for operating the shutter.

Figure 2 is a sectional view through the mercury switches forming a part of the invention.

Figure 3 is a front elevational view illustrating the shutters in their closed or active positions.

Figure 4 is a sectional view taken on line 4—4 of Figure 3.

Figure 5 is a front elevational view of the shutters, illustrating the shutters in their normal or inactive positions.

Figure 6 is a sectional view through the magnet housing in which the shutter controlling magnet is mounted.

Figure 7 is a sectional view through the magnet housing showing the armature in its active position.

Figure 8 is a sectional view taken on line 8—8 of Figure 1.

Figure 9 is a plan view of the switch and roller supporting arms operated by the film strip.

Figure 10 is a plan view of one of the switch members forming a part of the apparatus.

Figure 11 is a sectional view through a modified form of switch.

Figure 12 illustrates a further modified form of switch.

Figure 13 is an elevational view taken at right angles to Figure 12.

Figure 14 is a side elevational view illustrating a still further modified form of switch.

Figure 15 is a view taken at right angles to Figure 14.

Figure 16 is a diagram illustrating the switches and mechanism when a normally closed circuit is used.

Referring to the drawings in detail, the device embodies a bracket member 5 which is curved to conform to the shape of the usual tubular lens support of a motion picture projecting machine.

Threaded openings are formed in the bracket member 5 and receive the winged screws 6 so that the bracket member may be securely clamped in position. The bracket member 5 also includes a downwardly extended arm 7 that has a laterally extended end portion 8 on which the curved gripping member 9 is formed, the gripping member 9 being designed to fit over the tubular lens support.

Secured to the bracket member 5 and supported thereabove, is a housing 10 in which the magnet 11 is mounted, the magnet 11 being designed to attract the armature 12 that is secured to the shaft 13 on which the shutter 14 is mounted, the shutter being designed to move with the shaft, for purposes to be hereinafter more fully described. This shutter 14 embodies outer and inner spaced disk-like members 15, spaced apart so that air may pass upwardly between the disklike members to cool the shutters.

An arm 16 extends from the shutter, and is provided with a handle 17, whereby the shutter may be manually operated so that it may be returned to its normal or inactive position to reset the machine. A weight indicated at 18 is secured to the shutter 14 and disposed in such position that when the armature 12 is released in a manner to be hereinafter more fully described, the weight 18 will cause the shutter 14 to swing downwardly from a position as shown by Figure 5 of the drawings, to a position as shown by Figure 1.

Mounted on the laterally extended end 8 of the arm 7, is a shaft 19 on which the arm 20 is mounted, the arm 20 providing a support for the shutter 21 which is adapted to swing to a position directly in front of the outer end of the lens carrying tube of the projecting machine, at a point between the shutter 14 and outer end of the lens supporting tube.

The coiled spring 22 is mounted on the shaft 19 and is designed to draw the shaft 19 inwardly, causing the sleeve 23 mounted on the shaft 19, to exert a pressure on the arm 20 to hold the shutter in its positions of adjustment.

Mounted on the free end of the arm 20, is a counterbalancing weight 24, and since the shutter 21 is a manually operated shutter, it will be obvious that by moving the shutter to either its active or inactive positions, the shutter will be held in such positions. This shutter also comprises spaced members 25 to insure against the shutter becoming hot.

A plate 26 is mounted on the shaft 13 and provides a support for the mercury switches 27 and 28 respectively, the mercury switches being so constructed that circuits will be completed through the switches when the shutter 14 is in its inactive position.

Wire 29 establishes communication between the magnet 11 and socket 30 positioned within the switch housing 31. Wires 32 and 33 connect with the motor 34 through which wires the electric current passes. The wires 35 lead from a suitable source of electricity supply and are brought into circuit with the wires 32', by means of the manually controlled knife switch 36. These wires 32 connect with the socket 37 which socket is in circuit with the wire 33, through the wire 38.

Positioned within the housing 31, are switch members 39 and 40 respectively, the switch member 39 being in circuit with the magnet 11, through the wire 41, mercury switch 27 and wire 42, to the end that the armature 12 will be held into engagement with the magnet 11, and the shutter 14 will be held in its inactive position, while the current is running to the motor 34 to operate the picture reels.

In case of an emergency the circuit to the motor may be made direct, by plugging the wires 32, 32' and 33 into the auxiliary circuit including wires 33'.

The reference character 43 indicates a solenoid mounted in the switch housing 31, the core 44 thereof carrying the switch member 45 at the outer end thereof, which switch member bridges the switch members 39 and 40, to complete the circuit through the magnet 11 and motor 34.

Coiled spring 46 surrounds the core 44 and normally acts to urge the switch member 45 to a position to close the circuit between the switch members 39 and 40. The reference character 47 also indicates a switch housing in which the contact members 48 and 49 are mounted, the contact member 49 being in circuit with the solenoid 43 through the wire 50. The return circuit is made through the wire 51 which extends to the mercury switch 28. This mercury switch 28 is in circuit with the switch member 40, through the wire 52.

Cooperating with the contact members 48 and 49 is a switch member 53 that is mounted on one end of the pin 54, the opposite end of the pin 54 being supplied with a head 55 that normally rests on the upper surfaces of the arms 56 and 57 that cross each other within the switch housing 47. The arm 57 is mounted on the shaft 58, which in turn is mounted within the switch housing 47. Extending from the shaft 58 is an arm 59 on which the roller 60 is mounted, the roller being disposed in such position that the film strip indicated by the reference character 61 must pass thereover, in moving from the machine. Thus it will be seen that should the film strip 61 become taut, the arm 59 will swing downwardly in the direction of the arrow as shown by Figure 1, raising the arm 57 and causing the circuit to be completed between the contact members 48 and 49.

The arm 62 is connected with the shaft 63 on which the arm 56 is mounted, and as shown this arm 62 extends upwardly and laterally as at 63', where it supports the roller 64 in a position directly over the film strip, as the film strip passes from the spool 65 to the spool 66, to the end that should the film strip become taut at a point between the spools 65 and 66, the film strip will contact with the roller 64 and swing the arm 56 upwardly, moving the switch member 53 into engagement with the contact members 48 and 49 to complete the circuit.

Mounted adjacent to the upper end of the motion picture machine, is a switch housing 67 in which the contact arms 68 and 69 are mounted, the contact arms 68 and 69 being spaced apart. Directly opposite to the arms 68 and 69, are contact arms 70 and 71 being designed to cooperate with the switch bar 72 that is shown as disposed between the arms 68 and 69, and arms 70 and 71. The switch bar 72 is mounted on one end of the arm 73 that extends through the bottom of the switch housing 67, the arm 73 being mounted on one end of the arm 74 that is pivotally mounted on the switch housing, at 75. Carried at the outer end of the arm 74, is a depending end 76 that has a laterally extended portion 77. Mounted above the laterally extended portion 77 is a wide curved guard plate 78, the guard plate being so arranged with respect to the laterally extended portion 77 that the film strip passing to the spool 79 moves therebetween.

The contact arms 68 and 69 are in circuit with the wire 51, through the wire 80, while the contact arms 70 and 71 are in circuit with the wire 50, through the wire 81.

The reference character 82 designates a switch housing in which the switch arms 83 and 84 are mounted, the switch arm 83 being connected with the wire 50 through the wire 85, while the switch arm 84 connects with the wire 51, through the wire 86.

Slidably mounted within the switch housing 82 is a switch rod 87 that is normally held in its inactive position by the coiled spring 88. Pivotally mounted at one end of the switch housing 82 is an arm 89 on which the roller 90 is pivotally mounted, there being provided an extension 91 that normally engages one end of the switch rod 88.

As shown, the film strip 61 on passing over the roller 92 and spool 93, contacts with the roller 90 and holds the arm 89 in its inactive position. Should the film strip break between the roller 92 and spool 93, the arm 89 will swing downwardly, causing the extension 91 to exert a pressure on the switch rod 89 to move the arm 84 into engagement with the switch arm 83, completing the circuit through the wires 85 and 86.

Figure 11 of the drawings illustrates a modified form of film strip actuating switch, and includes a switch rod 94 that extends into the switch housing 95, the rod carrying the contact member 96 at its inner end, the contact member normally lying between the contact arms 97 and 98 supported within the housing. Spring 99 normally holds the contact member 96 in its inactive position. One end of the switch rod 94 connects with the ear 100 that extends upwardly from the curved guard plate 101, which is pivotally mounted on the shaft 102.

Extending downwardly from the guard plate 101, is an arm 103 that has a laterally extended end portion 104 disposed directly under the film strip 105 so that should the film strip buckle, it will contact with the curved guard plate 101, moving the guard plate and resulting in a relative movement of the switch rod 94 to complete the circuit between the contact arms 97 and 98, which in turn are in circuit with the solenoid 43, energizing the solenoid to cause it to operate to break the circuit to the motor and at the same time release the pivoted shutter which moves to a position to cut off the light rays from the lamps of the machine and protect the film strip against the heat from the light rays.

In the form of the invention as illustrated by Figure 12 of the drawings, the reference character 106 indicates the switch housing in which the vertically movable rod 107 is positioned, the rod 107 having a head at one end thereof, the head being positioned between the curved ends of the arms 109 and 110 respectively. The arm 109 has connection with the shaft 111 to which the arm 112 is connected, the arm 112 having a roller 113 at its outer end, contacting with the film strip 114. If the film strip becomes broken, it is obvious that downward pressure will be exerted to the arm 112, causing the curved end of the arm 109 to move over the head 108 to force the rod 107 inwardly.

Contact members 115 are mounted within the housing 106 and are brought together by the action of the rod 107, and since the contacts 115 are in circuit with the solenoid 43, it is obvious that the solenoid will be energized when the contacts 115 are brought together.

An arm 116 is mounted on the shaft 117, the arm 116 having a laterally extended portion 118 that supports the roller 119. Should the film strip 114 become taut or buckle at a point adjacent to the roller 119, the roller 119 and arm 118 will be swung upwardly, causing the arm 110 to operate the rod 107 to complete the circuit between the contacts 115.

A still further modified form of switch is shown by Figures 14 and 15 of the drawings in which the switch housing is indicated by the reference character 120. Contact arms 121 are mounted within the switch housing 120 and are in circuit with the solenoid 43, in a manner as previously described.

Extending into the switch housing is a switch member 122 that carries a contact bar 123 adapted to engage the contact arms 121 to complete a circuit between the arms. The switch member 122 is normally held in its inaction position by means of the coiled spring 124.

Pivotally mounted on the switch housing 120, is an arm 125 that supports the roller 126 at its outer end, which roller engages the film strip 127. At the opposite end of the arm 125 is an extension 128 that is adapted to engage the upper end of the switch member 120, to force the switch member downwardly, should the film strip 127 become broken. The arm 129 supports the roller 130 that is disposed directly over the film strip so that if the film strip becomes taut at a point above the spool 131, the film strip will contact with the roller 130 and swing the arm 129 upwardly. This arm 129 is pivotally supported on the bracket member 132 and has connection with one end of the shaft 143 to which the arm 134 is connected.

The arm 134 engages the switch member 135 that carries the contact bar 136 so that as the switch member 135 moves upwardly to engage the contact arms 121, the circuit will be completed. Secured to the shaft on which the arm 125 is mounted, is a rod 136 on which the weight 137 is mounted.

Shoulder the film strip 127 break, it is obvious that the weight 137 will swing the arm 136 downwardly to operate the switch member 122 to cause it to complete the circuit between the contact arms 121.

The construction and circuits described are of the normally open circuit type, while the circuit shown by Figure 16 of the drawings is of the normally closed type. In this form of the invention the automatic shutter is indicated by the reference character 138, the manually controlled shutter being indicated by the reference character 139, the shutter 138 being identical with the shutter 14.

The arm 140 extends from the arm of the shutter 138 and provides the armature for the magnet 141, the arm 140 providing a support for the mercury switches 142 and 143 respectively, which switches are in circuit with the wires 144, 145, 146 and 147 respectively. The reference character 148 designates a housing in which the solenoid 149 is mounted, the core of the solenoid being indicated at 150, and as shown this core is provided with a head 151 that provides a contact member that operates between the contact arms 152 and 153 respectively. A coiled spring 154 is mounted on the core and acts to move the head 151 away from the contact arms 152 and 153, when the electric circuit to the solenoid 149 is broken.

The wires 145 and 147 lead into the housing 148, the wire 147 being connected with the solenoid 149, while the wire 145 connects with the socket 155, the socket 155 being also in communication with the socket 156 through the wire 157.

Wires 158 and 159 are in circuit with the plug 160, the wires leading to the motor 161 that operates the projecting machine, through the belt 162. Wires 163 and 164 have connection with the plug 165 that is positioned in the socket 156, the socket being also in circuit with the arm 152, through the wire 166. In circuit with the wires 163, wires 164 and the service wires 167, is a control switch 168 that controls the current passing to the apparatus.

Auxiliary sockets 169 and 170 are mounted in the housing 148 and are connected by the wires 171, the sockets 169 and 170 providing means whereby the plugs 160 and 165 may be placed in circuit so that electric energy may pass to the motor 161, to operate the mechanism in emergency cases.

The reference character 172 designates the film strip that operates over the roller 173 mounted at the outer end of the pivoted arm 174, the arm 174 having a finger 175 adapted to engage the rod 176 that is slidably mounted, one end of the rod 176 engaging the pivoted switch arm 177 that normally engages the switch arm 178, completing the circuit therebetween. Thus it will be seen that should the film strip 172 become broken, the roller and arm will drop, causing the rod 176 to move inwardly against the arm 177, disengaging the arms 177 and 178 and breaking the circuit to the solenoid 149.

When the circuit to the solenoid 149 is broken, the coiled spring 154 operates to move the head 151 away from the arms 152 and 153, breaking the circuit to the motor 161, which immediately ceases to operate. Simultaneously with the movement of the head 151 to break the circuit, the circuit to the magnet 141 is broken, allowing the shutter 138 to swing downwardly in front of the projecting lense, cutting off the light rays to the film strip and protecting the film strip from the heat of the light rays.

Switch arms 179 and 180 are in circuit with the switch arms 177 and 178, the arms 179 and 180 being normally in contact with each other so that the circuit may pass therethrough. Connecting the arms 178 and 179 is a wire 181. The wire 182 is in circuit with the arm 180 and the switch arm 183, the arm 183 being in contact with the switch arm 184 that in turn is in circuit with the wiring that leads to the magnet, through the wire 146, switch 143 and wire 147.

As clearly shown, an arm 185 is pivotally mounted adjacent to the switch arms 179 and 180, the arm 185 being supplied with a roller 186 at its outer end, which roller normally contacts with the film strip 172. Resting on the inner end of the arm 185, is a vertically sliding rod 187 which is provided with an inwardly extended arm 188 that carries a roller 189, the roller being designed to engage the switch arms 179 or 180, to move the arms out of engagement. Pivotally supported above the rod 187, is an arm 190 which is provided with an inwardly extended end portion 191 normally engaging the upper end of the rod 187.

At the outer end of the arm 190 is a roller 192 which moves over the film strip 172, when the film strip is moved past the roller 192.

If the film strip becomes broken, it will operate to move the roller end of the arm 185 downwardly, which movement transmits an upward movement to the rod 187 to cause the roller 189 to move the arm 180 out of engagement with the arm 179, breaking the circuit and causing the magnet 141 and solenoid 149 to be deenergized, resulting in the stopping of the motor and the operating of the shutter 138. Should the film strip 172 become taut, the arm 190 will be moved upwardly, moving the rod 187 downwardly to cause the roller 189 to force the arm 179 out of engagement with the arm 180, breaking the circuit and causing the operation of the shutter and member 151 to break the circuit to the motor.

The film strip in its passage through the machine, also moves under the guard plate 193 and over the finger 194. This guard plate 193 is pivotally supported and is provided with an upstanding ear 195 to which the arm 196 is pivotally connected, the opposite end of the arm 196 being supplied with a roller 197 disposed between the switch arms 183 and 184. Should the film strip 172 buckle, at a point under the guard plate 193, it is obvious that the guard plate 193 will be tilted, causing the roller 197 to engage either the arm 183 or 184, to move the arms out of contact. A similar movement of the arm 196 will take place to break the circuit should the film strip 172 become taut and bind against the finger 194.

From the foregoing it will be obvious that due to the construction shown and described, the circuits through which electric energy is passing to the machine, and to the motor operating the projecting apparatus, will be broken by an abnomal condition of the film strip, thereby providing a structure which is purely automatic and one which will prevent any possibility of the film strip becoming ignited by the heat of the light rays of the projecting machine, should the film be stopped, in its passage through the machine.

Should the belt 162 break, the motor 161 would of course speed up in the absence of a load, to the end that the electric current would flow freely to the motor, reducing the current at the magnet, and allowing the armature to fall away from the magnet to operate the automatically controlled shutter 14.

It is thought that in view of the foregoing detail description, a further detail description as to the operation of the mechanism is unnecessary.

I claim:

The combination with a motion picture apparatus and the projector tube thereof, of a fire shutter including a bracket embodying a lower gripping member and an upper bracket member, said gripping member and bracket member being curved to conform to the curvature of the projector tube, screws extending through the upper bracket member and engaging the projector tube securing the bracket in position on the projector tube, an arm connecting the bracket member and the gripping member, shafts mounted on the bracket member and gripping member, shutters on the shafts and movable therewith, a housing on the upper bracket member, a magnet within the housing and an armature on the shaft of the upper bracket member and attracted by the magnet operating one of the shutters.

NICHOLAS A. NICHOLSON.